(12) United States Patent
Colbourne (10) Patent No.: US 8,045,854 B2
(45) Date of Patent: Oct. 25, 2011

(54) M×N WAVELENGTH SELECTIVE OPTICAL SWITCH (75) Inventor: Paul Colbourne, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 493 days.

(21) Appl. No.: 12/367,160

(22) Filed: Feb. 6, 2009

(65) Prior Publication Data

US 2010/0172646 A1      Jul. 8, 2010

Related U.S. Application Data

(60) Provisional application No. 61/026,836, filed on Feb. 7, 2008.

(51) Int. Cl.
    *H04J 14/00* (2006.01)
(52) U.S. Cl. .............. 398/48; 398/45; 398/47; 398/49; 398/50; 398/83; 385/24; 385/37; 385/16; 385/17; 385/18
(58) Field of Classification Search ............ 398/45, 398/46, 47, 48, 49, 50, 51, 52, 53, 54, 55, 398/56, 57, 58, 59, 79, 82, 83, 84, 86, 87, 398/88; 385/24, 37, 16, 17, 18, 15, 42, 45
    See application file for complete search history.

(56) References Cited

U.S. PATENT DOCUMENTS

| | | | |
|---|---|---|---|
| 6,097,859 A | 8/2000 | Solgaard et al. ............... 385/17 |
| 6,289,145 B1 | 9/2001 | Solgaard et al. ............... 385/17 |
| 6,327,398 B1 | 12/2001 | Solgaard et al. ............... 385/18 |
| 6,374,008 B2 | 4/2002 | Solgaard et al. ............... 385/17 |
| 6,389,190 B2 | 5/2002 | Solgaard et al. ............... 385/18 |
| 6,404,940 B1 | 6/2002 | Tsuyama et al. ............... 385/17 |
| 6,498,872 B2 | 12/2002 | Bouevitch et al. ............. 385/24 |
| 6,614,953 B2 | 9/2003 | Strasser et al. ................. 385/17 |
| 6,707,959 B2 | 3/2004 | Ducellier et al. ............... 385/17 |
| 6,711,316 B2 | 3/2004 | Ducellier ........................ 385/17 |
| 6,711,320 B2 | 3/2004 | Solgaard et al. ............... 385/18 |
| 6,760,501 B2 | 7/2004 | Iyer et al. ....................... 385/16 |
| 6,810,169 B2 | 10/2004 | Bouevitch ...................... 385/24 |
| 6,819,823 B2 | 11/2004 | Solgaard et al. ............... 385/18 |
| 6,834,136 B2 | 12/2004 | Solgaard et al. ............... 385/18 |
| 6,891,989 B2 | 5/2005 | Zhang et al. ................... 385/16 |
| 6,922,239 B2 | 7/2005 | Solgaard et al. ............... 356/326 |
| 7,072,539 B2 | 7/2006 | Wu et al. ........................ 385/18 |
| 7,336,867 B2 | 2/2008 | Wu et al. ........................ 385/18 |
| 7,469,080 B2 | 12/2008 | Strasser et al. ................. 385/17 |
| 7,620,321 B2 * | 11/2009 | Miura et al. ................... 398/45 |
| 7,933,519 B2 * | 4/2011 | Akiyama et al. ............... 398/50 |
| 2006/0198583 A1 | 9/2006 | Oikawa et al. ................. 385/53 |
| 2006/0210266 A1 | 9/2006 | Aoki .............................. 398/19 |
| 2007/0242953 A1 | 10/2007 | Keyworth et al. ............. 398/48 |

* cited by examiner

*Primary Examiner* — Hanh Phan

(74) *Attorney, Agent, or Firm* — Teitelbaum & MacLean; Neil Teitelbaum; Doug MacLean (57) ABSTRACT

A M×N wavelength selective optical switch (WSS) for switching K wavelength channels is disclosed. The WSS has two MEMS micromirror arrays, a M×K array and a 1×N array, for switching any wavelength channel from any input port to any output port, provided that any output port receives optical signals from only one input port. The WSS can be used to build fully reconfigurable, colorless and directionless node of an agile optical network.

20 Claims, 11 Drawing Sheets

M×N WAVELENGTH SELECTIVE OPTICAL SWITCH

CROSS-REFERENCE TO RELATED APPLICATIONS

The present invention claims priority from U.S. Patent Application No. 61/026,836 filed Feb. 7, 2008, entitled "M×N Wavelength Selective Switch", by Colbourne et al., which is incorporated herein by reference for all purposes.

TECHNICAL FIELD

The present invention relates to optical switch devices, and in particular to wavelength selective optical switch devices having a plurality of input and output ports.

BACKGROUND OF THE INVENTION

In an optical communication network, optical signals having a plurality of optical channels at individual wavelengths, called "wavelength channels", are transmitted from one location to another, typically through a length of an optical fiber. An optical cross-connect module allows switching of optical signals from one optical fiber to another. A wavelength-selective optical cross-connect, or wavelength selective switch (WSS) module, allows reconfigurable wavelength-dependent switching, that is, it allows certain wavelength channels to be switched from a first optical fiber to a second optical fiber while letting the other wavelength channels propagate in the first optical fiber, or it allows certain wavelength channels to be switched to a third optical fiber. An optical network architecture based on wavelength-selective optical switching, which is sometimes called an "agile" optical network architecture, has many attractive features due to its ability to automatically create or re-route optical paths of individual wavelength channels. It accelerates service deployment, accelerates rerouting around points of failure of an optical network, reduces capital and operating expenses for a service provider, as well as creates a future-proof topology of the network.

Most WSS modules of the present state of the art are constructed to switch wavelength channels between one input optical fiber and a few, for example four or eight, output optical fibers. In particular, a folded symmetrical 4-f configuration taught in U.S. Pat. No. 6,498,872 by Bouevitch et al., with an optional field-flattening optical wedge taught in U.S. Pat. No. 6,760,501 by Iyer et al., both assigned to JDS Uniphase Corporation and incorporated herein by reference, allow construction of WSS modules for performing the abovementioned wavelength channel switching function. Multiport WSS modules are taught in U.S. Pat. Nos. 6,707,959 by Ducellier et al. and 6,810,169 by Bouevitch, both assigned to JDS Uniphase Corporation and incorporated herein by reference; and a multi-module unit is taught in US Patent application publication 20070242953 by Keyworth et al., which is incorporated herein by reference.

The abovementioned 1×N WSS modules, although beneficial for agile optical networks as mentioned above, have their limitations that are related to having only one input port, or only one output port when a 1×N WSS module is used in a reverse direction. One such limitation is related to having wavelength channels at the same wavelength in the same network. Since the wavelengths of all wavelength channels have to be different at any single port to avoid undesired interference, having one input or one output port in a WSS device results in the entire device being incapable of handling more than one "instance" of a wavelength channel. Another limitation is related to reliability and redundancy requirements. Having all the traffic propagating in a single optical fiber connected to the single input or output port of a 1×N WSS lowers the reliability of an optical network, because a damage to that single fiber may result in a catastrophic failure of the entire network. Therefore, M×N WSS modules are highly useful in agile optical networks.

Figure 1A:
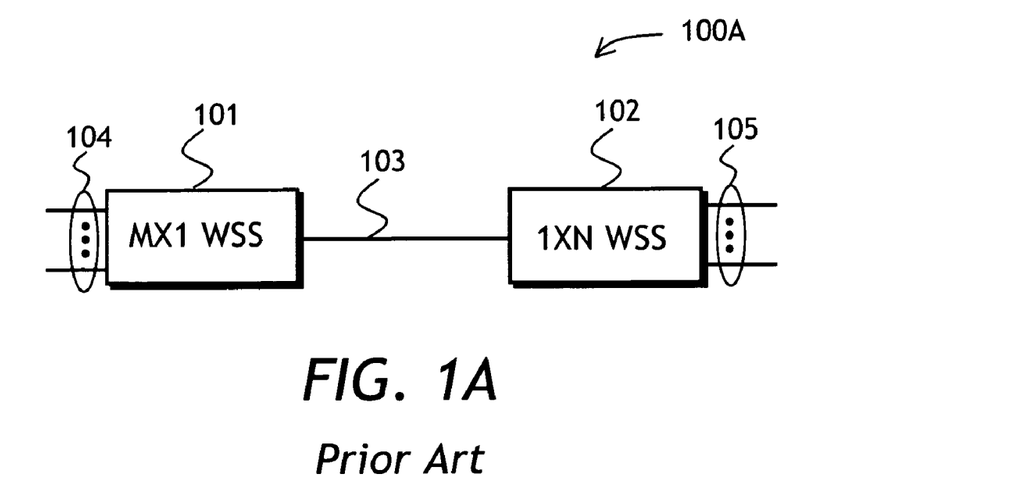
FIGS. 1A, 1B are optical circuits of prior-art multi-input port, multi-output port wavelength selective switches.
Figure 1B:
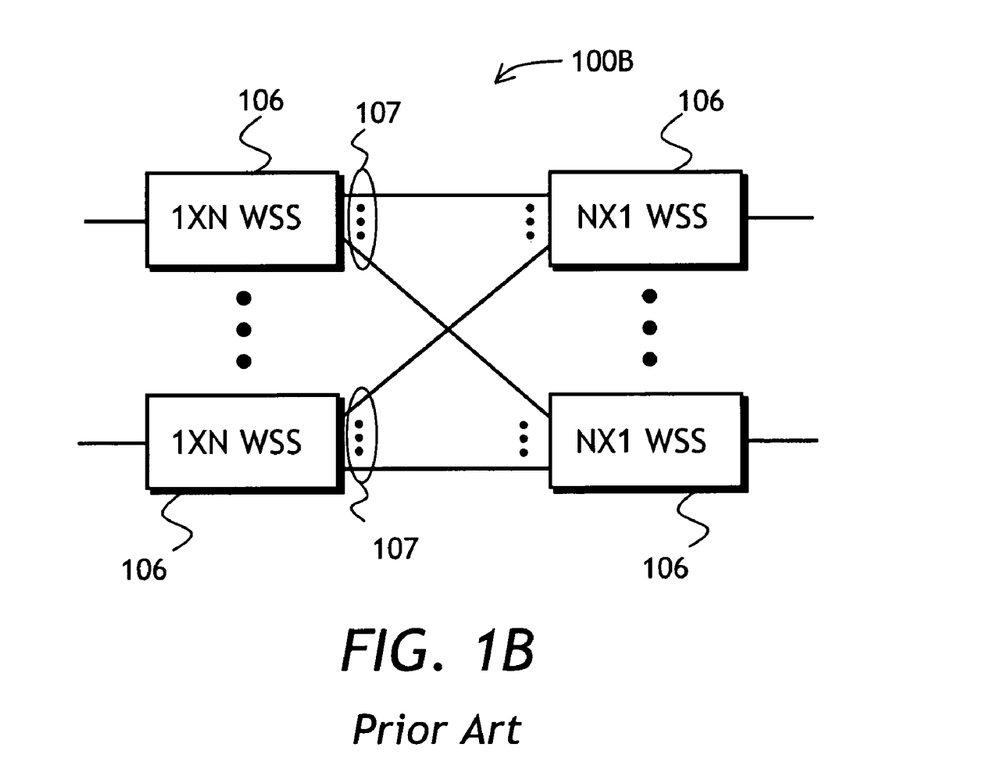

Prior-art implementations of a M×N WSS include connecting M×1 and 1×N WSS modules in series or in parallel. Referring to FIG. 1A, a compound M×N WSS module 100A is shown having a M×1 WSS module 101 and 1×N WSS module 102. The modules 101 and 102 are connected serially with a common optical fiber 103. The combined module 100 has M input ports 104 and N output ports 105. Detrimentally, the WSS 100A is "wavelength-blocking", meaning that it does not allow routing of wavelength channels at the same wavelength, appearing at different input ports 104. Referring now to FIG. 1B, a compound N×N WSS module 100B is shown having 2N 1×N WSS modules 106 interconnected with N fiber bundles 107. The WSS module 100B is "non-blocking", however this is achieved at a very high cost of having to use many 1×N WSS modules 106. Furthermore, both modules 100A and 100B have high insertion loss, since an optical signal has to pass through two modules.

U.S. Pat. No. 6,711,316 by Ducellier, assigned to JDS Uniphase Corporation and incorporated herein by reference, discloses a N×N wavelength cross-connect having two N×K arrays of beam deflectors, wherein K is the number of wavelengths. Detrimentally, the WSS of Ducellier is bulky, essentially having two WSS modules connected back-to-back, and not readily expandable for large number of ports, for example, at N=40 ports and K=80 wavelengths, it requires two arrays of 40×80 beam deflectors.

It is therefore a goal of the present invention to provide a single M×N WSS module having improved cost and performance characteristics as compared to two individual M×1 and 1×N WSS modules, while being non-blocking, that is, allowing to switch wavelength channels at the same wavelengths between M input ports and N output ports. Unexpectedly and advantageously, the construction of the WSS module of the present invention automatically prevents wavelength channels at the same wavelength from appearing at the same output port.

SUMMARY OF THE INVENTION

A wavelength selective switch module of the present invention is capable of independently routing any wavelength channel from any input port to any output port, even if a channel at the same wavelength appears at different input ports. Such a switch can be used to implement "directionless" ports for wavelength selective routing to any of N network directions or paths, rather than being limited to only one network path.

A wavelength selective switch module of the present invention is non-blocking, meaning that signals at the same wavelength on different input ports of the module can be independently and simultaneously routed to different output ports thereof, provided that only one such signal is directed to any one output port thereof. As will be shown below, the restriction of only one signal per output port allows for a huge reduction in the number of required beam steering elements.

In accordance with the invention there is provided a M× N wavelength selective switch (WSS) module comprising:

M input ports each for inputting a light beam having K wavelength channel sub-beams, and N output ports for outputting a light beam, wherein K, M, N are integer numbers larger than unity;

a wavelength dispersive element for spatially separating the wavelength channel sub-beams along M spaced apart lines of dispersion, wherein each said line of dispersion corresponds to a particular of the M input ports;

a first director array comprising M rows of K directors for directing the wavelength channel sub-beams, wherein each of the M rows is disposed along a particular of the M lines of dispersion, and wherein in each of said M rows, one director is disposed to direct one wavelength channel sub-beam, in dependence upon a control signal applied to that director;

an intermediate focal plane, for receiving the wavelength channel sub-beams;

wherein the M input ports are optically coupled to the wavelength dispersive element, and the wavelength dispersive element is optically coupled to the first director array and to M locations on the intermediate focal plane, wherein each of said M locations corresponds to a particular of the M input ports, wherein each particular wavelength channel sub-beam has an angle of incidence onto said intermediate focal plane, depending upon a control signal applied to a corresponding director of the first director array, disposed to direct that particular wavelength channel sub-beam;

a second director array comprising N directors for directing the wavelength channel sub-beams, wherein each director is optically coupled to a particular of N output ports, for selecting only one of the M input ports to be optically coupled to said particular of the N output ports, in dependence upon control signals applied to the corresponding director of the second director array;

a switching coupler for optically coupling any particular wavelength channel sub-beam at any of said M locations on the intermediate focal plane to any one of the N directors of the second director array, depending upon the angle of incidence of that particular wavelength channel sub-beam onto the intermediate plane;

whereby any one of the K wavelength channel sub-beams in a particular one of the M input ports is independently switchable into any particular one of the N output ports, in dependence upon control signals applied to corresponding directors of the first and the second director arrays, provided that wavelength channel sub-beams from only one of the M input ports are switchable into the particular one of the N output ports.

In accordance with another aspect of the invention there is further provided a multi-input port, multi-output port WSS module comprising:

a plurality of input ports for launching an optical beam including a plurality of wavelength channel sub-beams each characterized by a beam angle;

a two-dimensional array of switching reflectors, each switching reflector for receiving one wavelength channel sub-beam launched by one input port, and for redirecting said wavelength channel sub-beam by modifying the beam angle thereof;

a wavelength dispersive coupler for receiving the wavelength channel sub-beams from the input ports, for spatially separating the wavelength channel sub-beams, for optically coupling the wavelength channel sub-beams to the first array of switching reflectors, for receiving the wavelength channel sub-beams redirected by said first array of switching reflectors, and for spatially recombining the redirected wavelength channel sub-beams;

an angle-to-offset converter for receiving the spatially recombined, redirected wavelength channel sub-beams from the wavelength dispersive coupler, and for converting the beam angle of the received wavelength channel sub-beams into a lateral offset of said wavelength channel sub-beams; and an array of selector reflectors disposed for redirecting the offset wavelength channel sub-beams, so as to couple said sub-beams into a selected one of the output ports, whereby any said wavelength channel sub-beam is switchable between any said input port and any said output port, wherein any selector reflector is disposed to couple wavelength channel sub-beams from only one selected input port, thereby preventing wavelength channel sub-beams launched by any other input port from interfering with the wavelength channel sub-beams launched by the selected input port.

In accordance with yet another aspect of the invention there is provided a colorless directionless optical network node for wavelength selective routing of wavelength channels between N directions, wherein each of the N directions has an incoming line and an outgoing line; for adding M wavelength channels at the node; and for dropping M wavelength channels at the node, wherein M and N are integer numbers larger than unity; the node comprising:

first and second M×N WSS modules, each for wavelength selective switching between M first ports thereof and N second ports thereof, wherein the M first ports of the first and the second M×N WSS modules are for adding and dropping wavelength channels at the node, respectively;

N distributor modules each comprising one input port and N output ports, each associated with a particular of the N incoming lines, for receiving wavelength channels at the input port thereof from the associated incoming line coupled thereto, and for distributing said wavelength channels among the N output ports thereof;

N combiner modules each comprising N input ports and one output port, each said combiner module being associated with a particular of the N outgoing lines, for combining wavelength channels at the N input ports thereof and outputting the combined wavelength channels at the output port thereof coupled to the associated outgoing line thereof;

wherein each of the N second ports of the first M×N WSS module is coupled to an input port of a particular of the N combiner modules;

wherein each of the N second ports of the second M×N WSS module is coupled to an output port of a particular of the N distributor modules; and wherein each of the remaining N−1 output ports of each of the N distributor modules is coupled to an input port of a particular of the N combiner modules;

whereby any wavelength channel in the incoming line of any direction is switchable to the outgoing line of any other direction or droppable at the node, and whereby any wavelength channel addable at the node is switchable into the outgoing line of any direction.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2A:
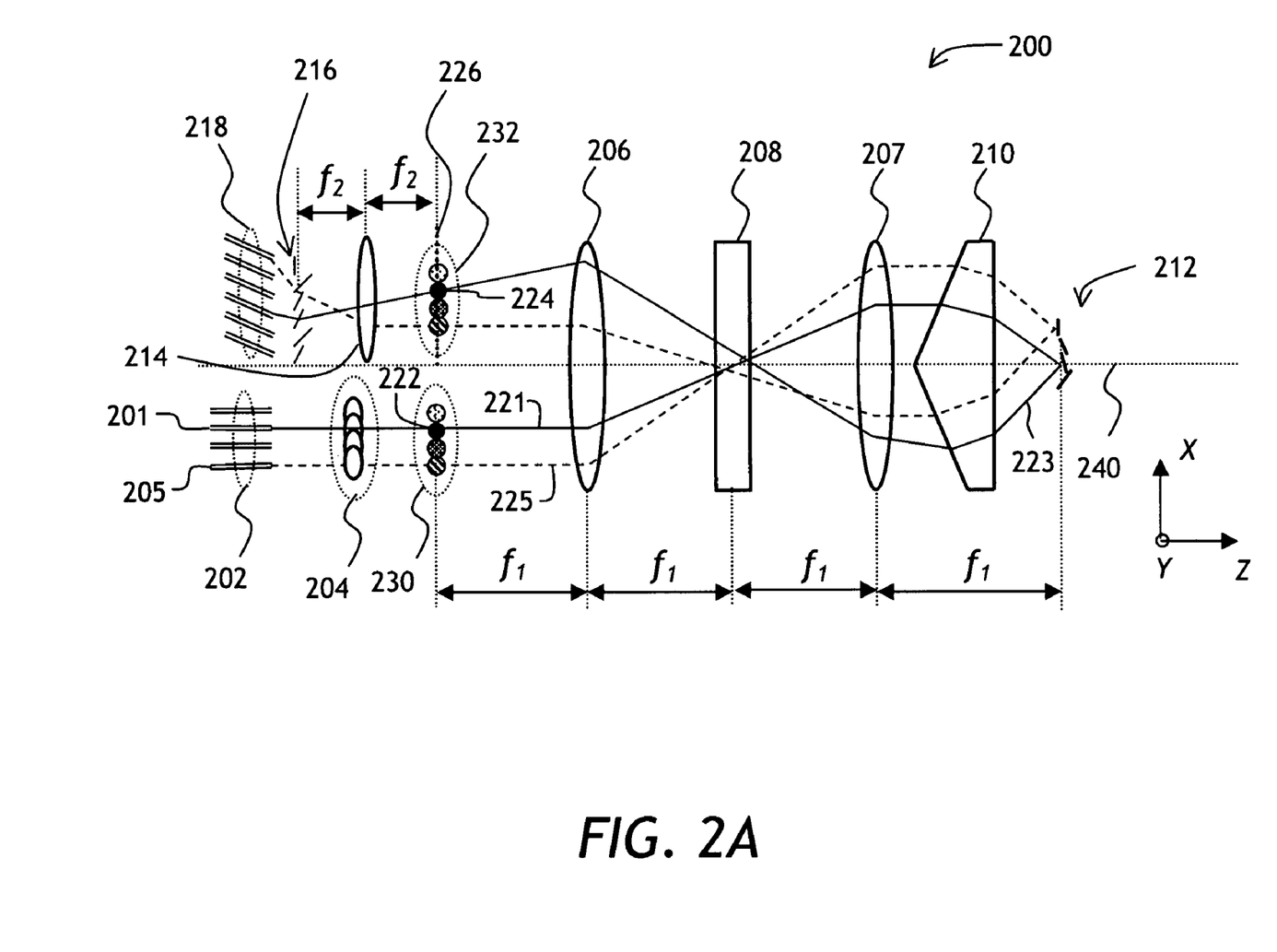
FIGS. 2A to 2C are optical diagrams of a M×N wavelength selective switch (WSS) of the present invention.

Referring to FIG. 2A, an M×N wavelength selective switch (WSS) 200 is shown having an input fiber array 202 of M input fibers, an input microlens array 204 of M microlenses, a collimating lens 206, a focusing lens 207, both said lenses having a focal length $f_1$, a diffraction grating 208 disposed one focal length $f_1$ away from the lenses 206 and 207, a roof prism 210, a first micro-electromechanical (MEMS) micromirror array 212 disposed one focal length $f_1$ away from the lens 207, a switching lens 214, a second MEMS micromirror array 216, and output fiber array 218 of N output fibers. In operation, a diverging light beam 221 emitted by a fiber 201 of the input fiber array 202 is collimated by a corresponding microlens of the microlens array 204 to form a spot 222 one focal length $f_1$ away from the collimating lens 206. Even though the beam 222 is "collimated" at the spot 222, since the beam size is quite small, it continues to diverge, the divergence not illustrated, and is subsequently collimated by the collimating lens 206, which couples it to the diffraction grating 208. The diffraction grating 208 spreads the beam 222 into a plurality of sub-beams, each sub-beam carrying a separate wavelength channel. Herefrom, a term "wavelength channel sub-beam" will be used to denote such a sub-beam, for brevity. The plurality of the wavelength channel sub-beams are dispersed by the diffraction grating in a plane parallel to the YZ plane in FIG. 2A. The dispersed wavelength channel sub-beams are coupled by the focusing lens 207, through the roof prism 210 the purpose of which will be explained later, onto the MEMS micromirror array 212. The array 212 has M rows of K micromirrors, where K is the total number of wavelength channels, and is disposed so that each of the micromirrors is illuminated by a particular of the K wavelength channel sub-beams emitted by a particular of the M input fibers. The beam angle of each wavelength channel sub-beam reflected from a corresponding MEMS micromirror is determined by a tilt of the corresponding MEMS micromirror, in dependence upon a control signal, not shown, applied to each MEMS micromirror of the array 212.

A reflected wavelength channel sub-beam 223 of the beam 221 propagates back through the roof prism 210, the lens 207, the diffraction grating 208, and the lens 206, which focuses the sub-beam 223 into a spot 224 at an intermediate focal plane 226. Since the intermediate plane 226, the lens 206, the diffraction grating 208, the lens 207, and the MEMS micromirror array 212 are disposed one focal length $f_1$ away from each other, the beam angle of the beam 223 at the spot 224 is determined only by the beam angle at the MEMS micromirror array 212, which is determined by a tilt of the corresponding micromirror of the MEMS micromirror array 212. Furthermore, any wavelength channel sub-beam of the beam 221 emitted by the input fiber 201 will focus substantially in the same spot 224, regardless of the tilt of a MEMS micromirror the wavelength channel sub-beam reflected from, because on the way back from the MEMS array 212 to the intermediate focal plane 226, the individual wavelength channels are recombined by the diffraction grating 208. Thus, the spot 224 is common for all the wavelength channel sub-beams emitted by the input fiber 201, or all wavelength channels of a corresponding "input port", that is, a tip of the fiber 201. What is different, however, is the beam angles of individual wavelength channel sub-beams at the spot 224, since the beam angles are individually determined by the angle of tilt of corresponding micromirrors of the MEMS micromirror array 212.

The purpose of the switching lens 214 will now be explained. The switching lens 214 having a focal length $f_2$ is disposed one focal length $f_2$ away from the intermediate focal plane 226. The second MEMS micromirror array 216 is disposed one focal length $f_2$ away from the switching lens 214. Therefore, the switching lens 214 acts as an angle-to-offset converter: the beam position on the MEMS array 216 is determined by beam angle, and only beam angle, of the wavelength channel sub-beams comprising the beam 221. Since the beam angles of individual wavelength channel sub-beams are individually determined by the angle of tilt of corresponding micromirrors of the MEMS micromirror array 212, then the wavelength channel sub-beams emitted by the fiber 201 can be individually directed to fall on corresponding micromirror of the second MEMS micromirror array 216.

The second MEMS micromirror array 216 has N micromirrors, each said micromirror being associated with a particular of N output fibers of the output fiber array 218. The role of the second MEMS micromirror array 216 is to couple a wavelength channel sub-beam falling onto its micromirror to the output fiber corresponding to said micromirror. Which wavelength channel sub-beam is coupled depends on the micromirror tilt angle that, in its turn, depends on a control signal, not shown, applied to the micromirror of the array 216. In this way, any one of the K wavelength channel sub-beams in the input fiber 201 is independently switchable into any particular one of the N output fibers, depending upon the individually controllable tilt angles of corresponding MEMS micromirrors of the arrays 212 an 216. Similarly, wavelength channel sub-beams 225 emitted by an input fiber 205 of the array 202 are independently switchable. In general, a light beam emitted by an input fiber of the fiber array 202 is collimated into a particular spot of an array of spots 230, which is imaged onto an array of corresponding spots 232 at the intermediate plane 226, each spot in the array of spots 232 corresponding to a unique input fiber of the fiber array 202.

The purpose of the roof prism 210 is to offset light beams impinging onto the MEMS array 212 relative to light beams reflected therefrom. In this way, the optical elements 202 and 204 can be offset relative to the optical elements 214, 216, and 218, so that these two groups of optical elements can be disposed on the opposite sides of an optical axis 240, without a mechanical interference.

Figure 2B:
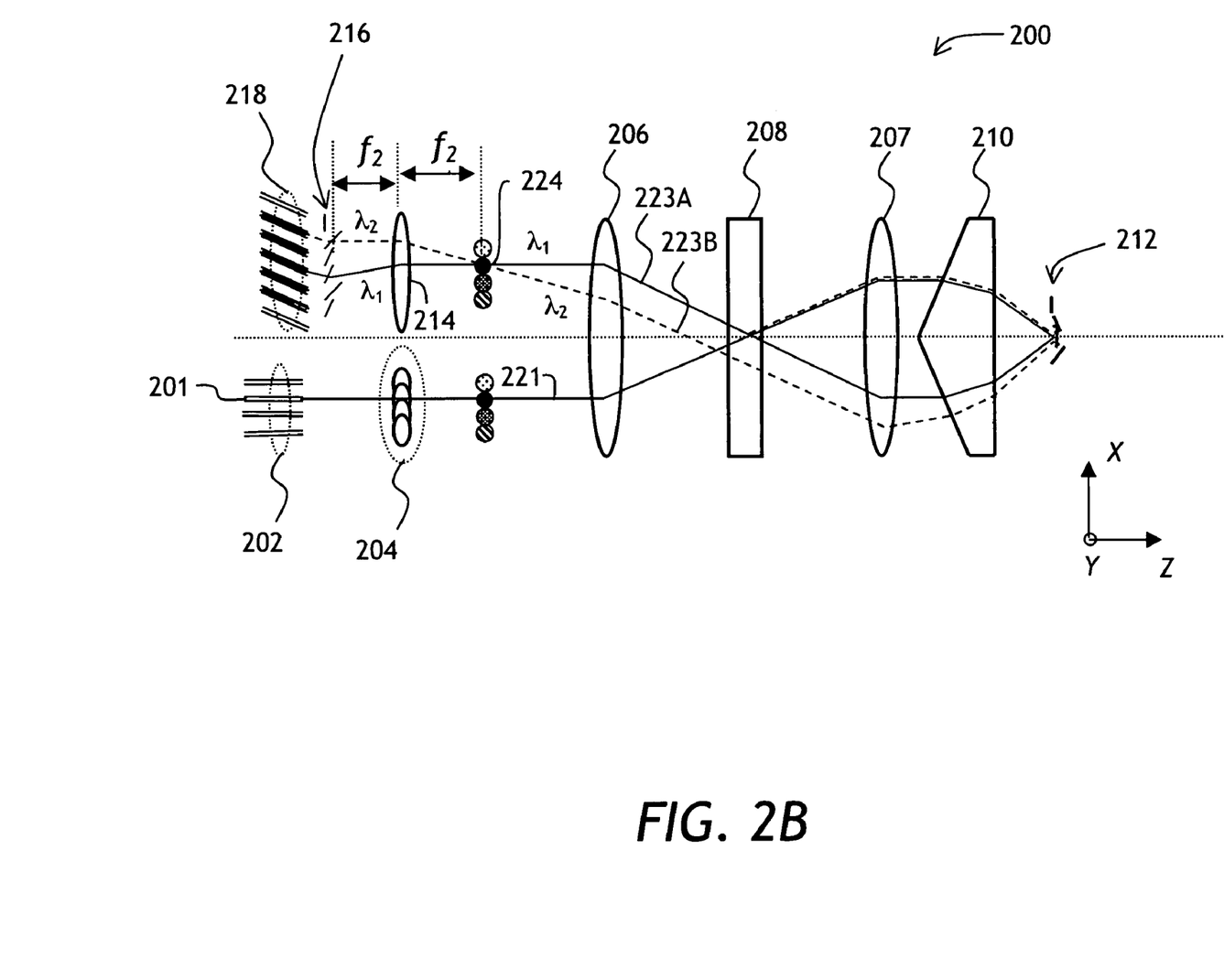

Referring now to FIG. 2B, the optical arrangement of the WSS 200 of FIG. 2A is repeated with the purpose of further explaining the principle of switching wavelength channels between N output ports according to the present invention. The light beam 221 emitted by the input fiber 201 has two wavelength channel sub-beams 223A and 223B at wavelengths $\lambda_1$ and $\lambda_2$, respectively. In going towards the MEMS micromirror array 212, the sub-beams 223A and 223B are spatially separated by the diffraction grating 208. Their beam angles are modified by individual mirrors of the MEMS array 212 as shown by the solid and dashed lines 223A and 223B, respectively. The sub-beams 223A and 223B are recombined at the spot 224. The switching lens 214 directs the sub-beams 223A and 223B towards corresponding micromirrors of the second MEMS micromirror array 216, in dependence on their beam angles; the micromirrors of the second MEMS micromirror array 216 are tilted so as to couple the wavelength channel sub-beams 223A and 223B to corresponding output fibers of the output fiber array 218.

Figure 2C:
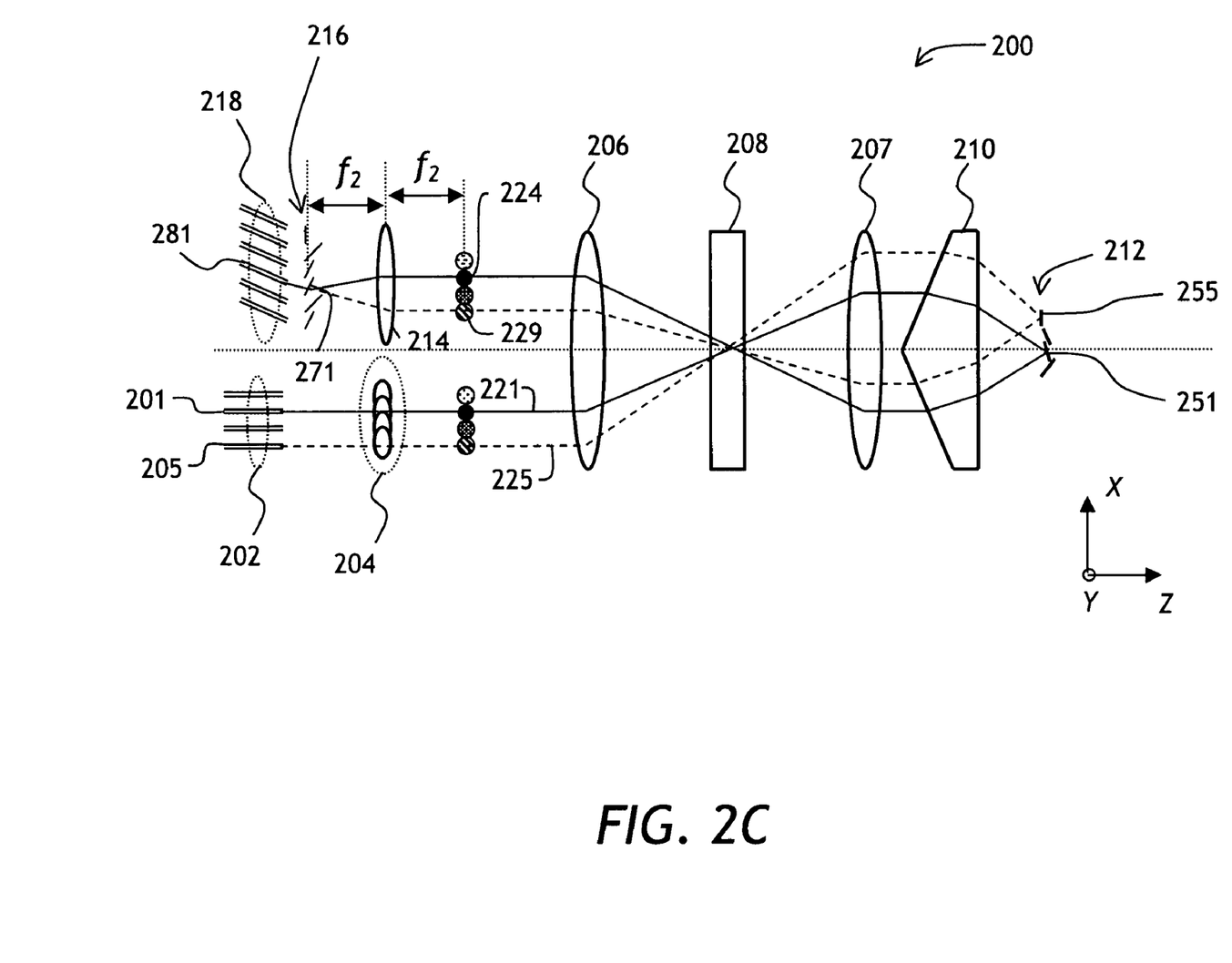

Referring now to FIG. 2C, the optical arrangement of the WSS 200 of FIG. 2A is repeated with the purpose of further explaining the principle of selecting one of the M input optical fibers for each one of the N output optical fibers of the WSS 200. The light beams 221 and 225 emitted by the input fibers 201 and 205, respectively, of the input fiber array 202, propagate towards their respective micromirrors 251 and 255 of the first MEMS micromirror array 212 and are redirected by these micromirrors towards the switching lens 214, forming the spots 224 and 229 one focal length $f_2$ away from said lens 214. In this example, the micromirrors 251 and 255 are tilted at the same angle, so that the beams 221 and 225 fall on a same micromirror 271 of the second MEMS micromirror array 216. The mirror 271 is associated with an output fiber 281. Depending on the angle of tilt of the mirror 271, either the beam 221 or the 225 is coupled into the output fiber 281. Thus, the WSS 200 of the present invention has an important practical limitation that only one input fiber, or only one input port, can be coupled to each output fiber, or each output port. The advantage of this limitation is that the construction of the WSS 200 precludes wavelength channels at the same wavelength present at different input ports from ever entering the same output port, thereby preventing undesired interference between the wavelength channels at the same wavelength.

Even though the WSS 200 is shown in FIGS. 2A to 2C as having the lenses 206, 207, and 214 and the diffraction grating 208, it is understood by those skilled in the art that the lenses may be replaced by concave mirrors or even by a single concave mirror, and the diffraction grating 208 may be replaced by any other wavelength dispersive element for spatially separating individual wavelength channel sub-beams, such as a prism, an Echelle grating, or a grism, for example. Further, the roof prism 210 can be replaced by another offset element serving the same purpose as the roof prism. For example, a mirror or a pair of mirrors could be used. Furthermore, other methods of achieving the function of the roof prism are possible, for example replacing lens 206 with two separate lenses, not shown, one aligned with spots 230 and one aligned with spots 232, such that light beams 221 and 223 do not cross at the diffraction grating 208; instead the beams 221 and 223 would meet at the MEMS micromirror array 212 without the need for the roof prism 210.

Figure 3A:
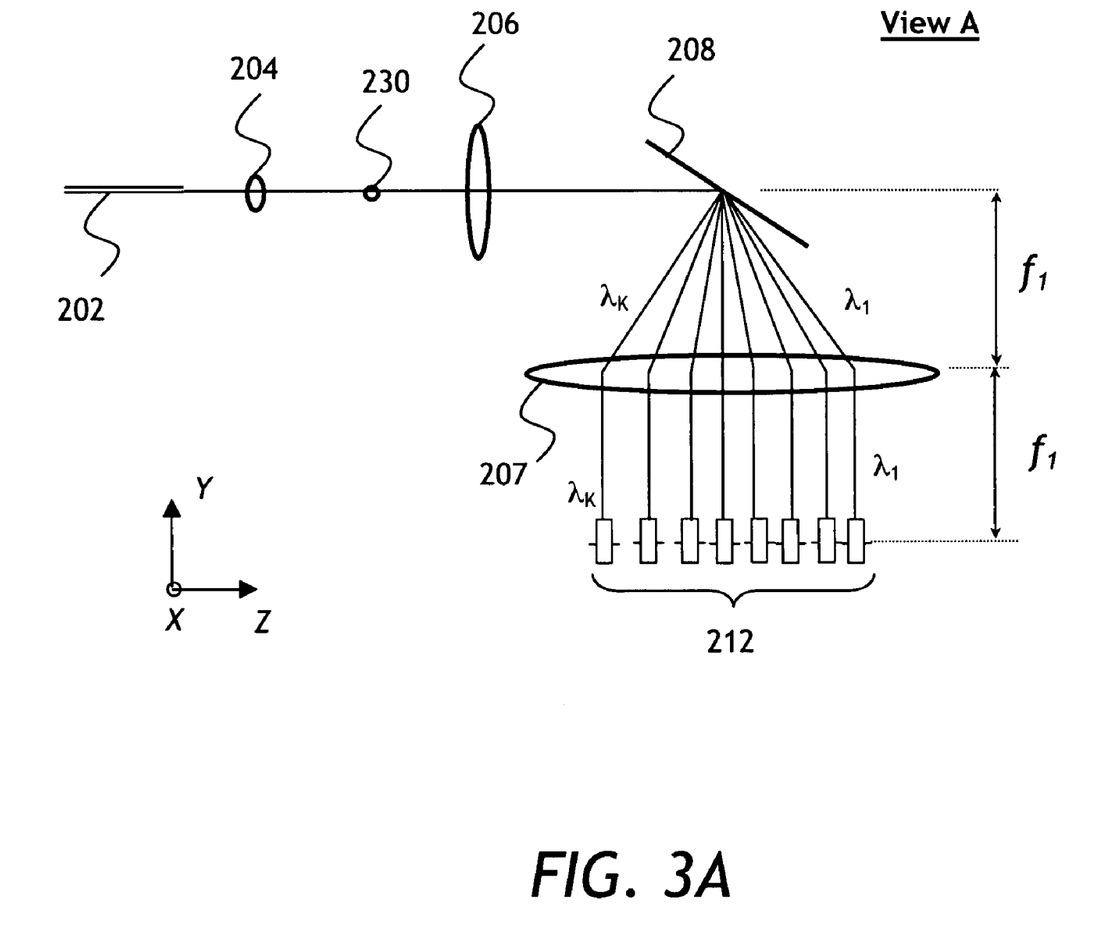
FIGS. 3A, 3B are top views of the incoming and the outgoing optical path, respectively, of the M×N WSS shown in FIGS. 2A to 2C.
Figure 3B:
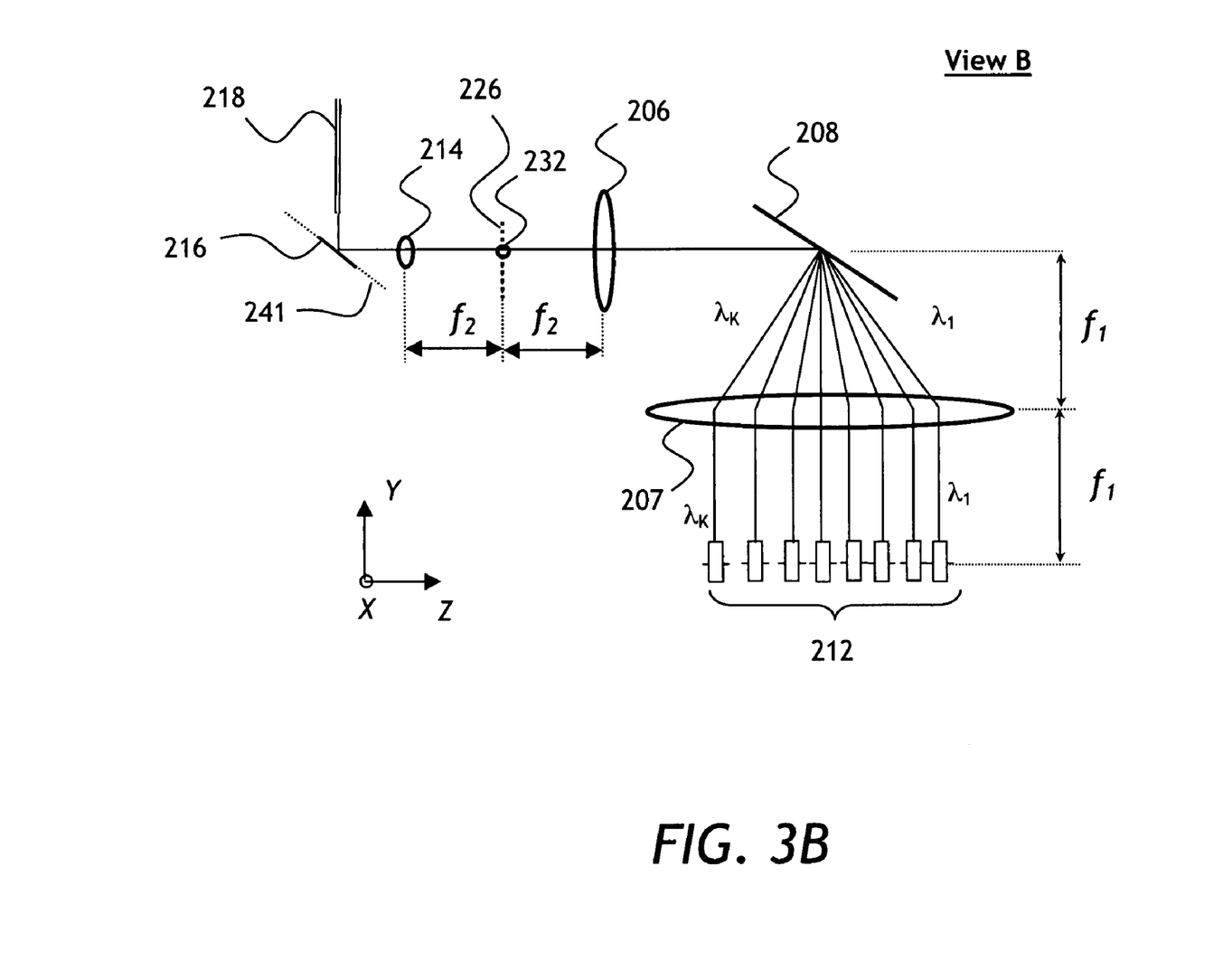

Turning now to FIGS. 3A and 3B, top Views A and B of the incoming and the outgoing optical paths, respectively, of the M×N WSS 200 are shown. The incoming path of the View A is shown in the YZ plane. The optical elements of the incoming path are the input fiber array 202, the microlens array 204, the collimating lens 206, the diffraction grating 208, the focusing lens 207, and the first MEMS micromirror array 212. In View A, wavelength channels at wavelengths $\lambda_1 \ldots \lambda_K$ are spatially separated, or dispersed, by the diffraction grating 208, so that each wavelength channel sub-beam impinges onto a particular micromirror of the MEMS micromirror array 212.

The outgoing optical path of View B is shown in the YZ plane as well. The optical elements of the outgoing path are: the first MEMS micromirror array 212, the focusing lens 207, the diffraction grating 208, the collimating lens 206, the switching lens 214, the second MEMS micromirror array 216, and the output fiber array 218. In View B, wavelength channels at wavelengths $\lambda_1 \ldots \lambda_K$ are spatially recombined by the diffraction grating 208 and the collimating lens 106 into the spot array 232 at the intermediate focal plane 226. The micromirrors of the second MEMS micromirror array 216 are tiltable about parallel axes 241, said axes being parallel to the YZ plane.

Figure 4:
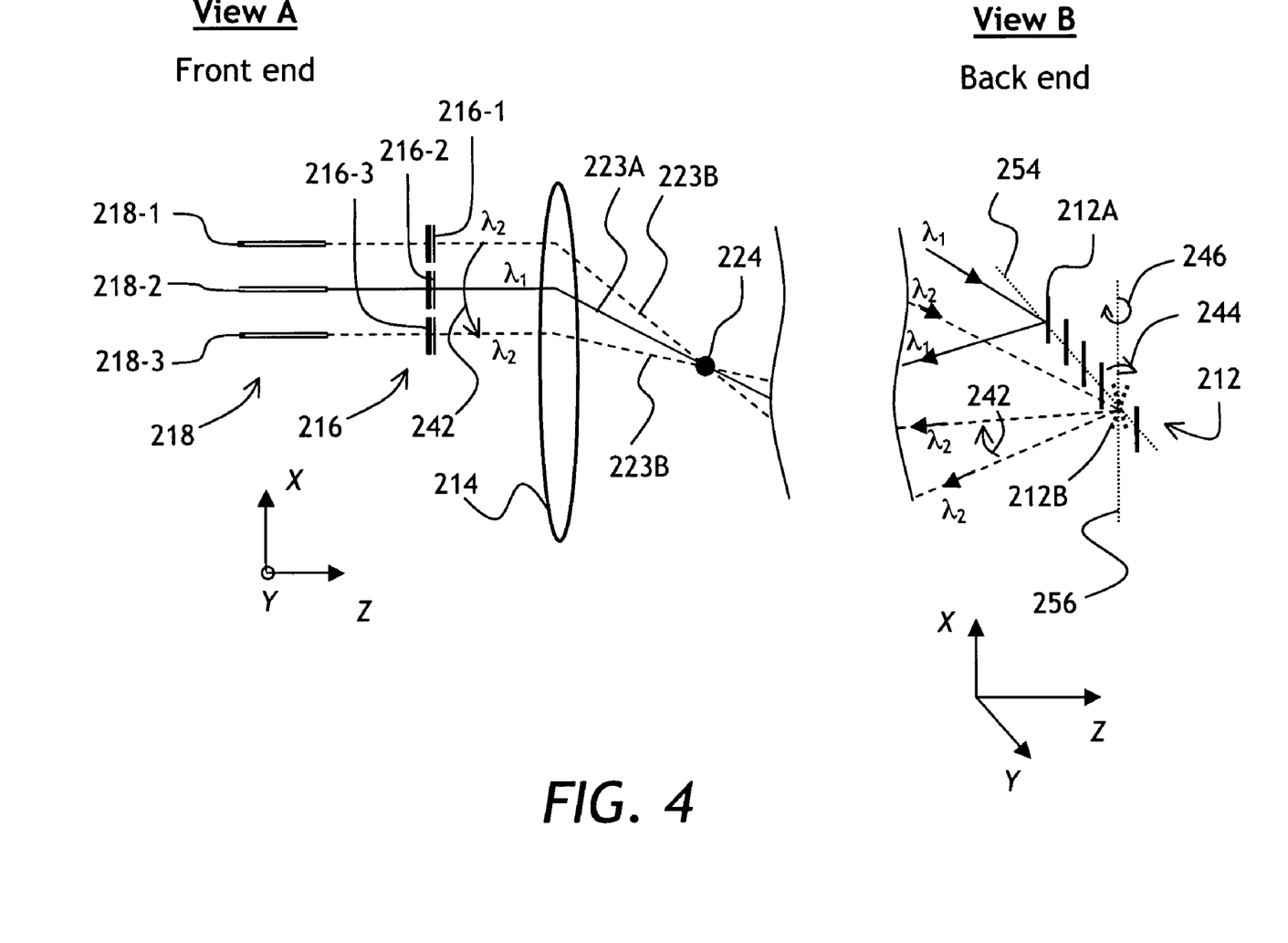
FIG. 4 is an optical diagram illustrating transient effects during switching optical channels between different output ports.

Referring now to FIG. 4, an optical diagram is presented that further illustrates a process of switching of wavelength channel sub-beams between various output optical fibers of the WSS 200. In FIG. 4, View A represents the front end and View B represents the back end of the WSS 200. The wavelength channel sub-beam 223A at the wavelength $\lambda_1$ reflects from a corresponding micromirror 212A of the first MEMS micromirror array 212, wherein said micromirror 212A is tilted so as to have the sub-beam 223A impinge onto a micromirror 216-2 of the second MEMS micromirror array 216. The micromirror 216-2 is tilted so as to couple said sub-beam 223A into an output fiber 218-2 of the output fiber array 218. The wavelength channel sub-beam 223B at the wavelength $\lambda_2$ reflects from a corresponding micromirror 212B of the first MEMS micromirror array 212, wherein said micromirror 212B is tilted so as to have the sub-beam 223B impinge onto a micromirror 216-1 of the second MEMS micromirror array 216. The micromirror 216 is tilted so as to couple said sub-beam 223B into an output fiber 218-1 of the output fiber array 218.

In View A of FIG. 4, the sub-beams 223A and 223B originate from the same spot 224 because these two sub-beams originate from the same input optical fiber, i.e. the fiber 201 in FIG. 2B. To switch the sub-beam 223B from the output fiber 218-1 to an output fiber 218-3 as shown by an arrow 242, the MEMS micromirror 212B is tilted about an axis 254 as shown by an arrow 244. However, as the sub-beam 223B is being switched from the fiber 218-1 to the fiber 218-3, it is coupled briefly to the fiber 218-2, which is on the way of a focal spot of the sub-beam 223B focused by the lens 214. This undesirable effect is preferably mitigated by tilting the micromirror 212B about an axis 256 during switching the beam 223B between the fibers 218-1 and 218-3, as shown by an arrow 246, so as to prevent the wavelength channel at the wavelength $\lambda_2$ from briefly appearing in the output fiber 218-2. Thus, the micromirrors of the first MEMS micromirror array 212 are preferably tiltable about two orthogonal axes. The biaxial operation of micromirrors of the array 212 allows for a "hitless" operation of the WSS 200.

Figure 5:
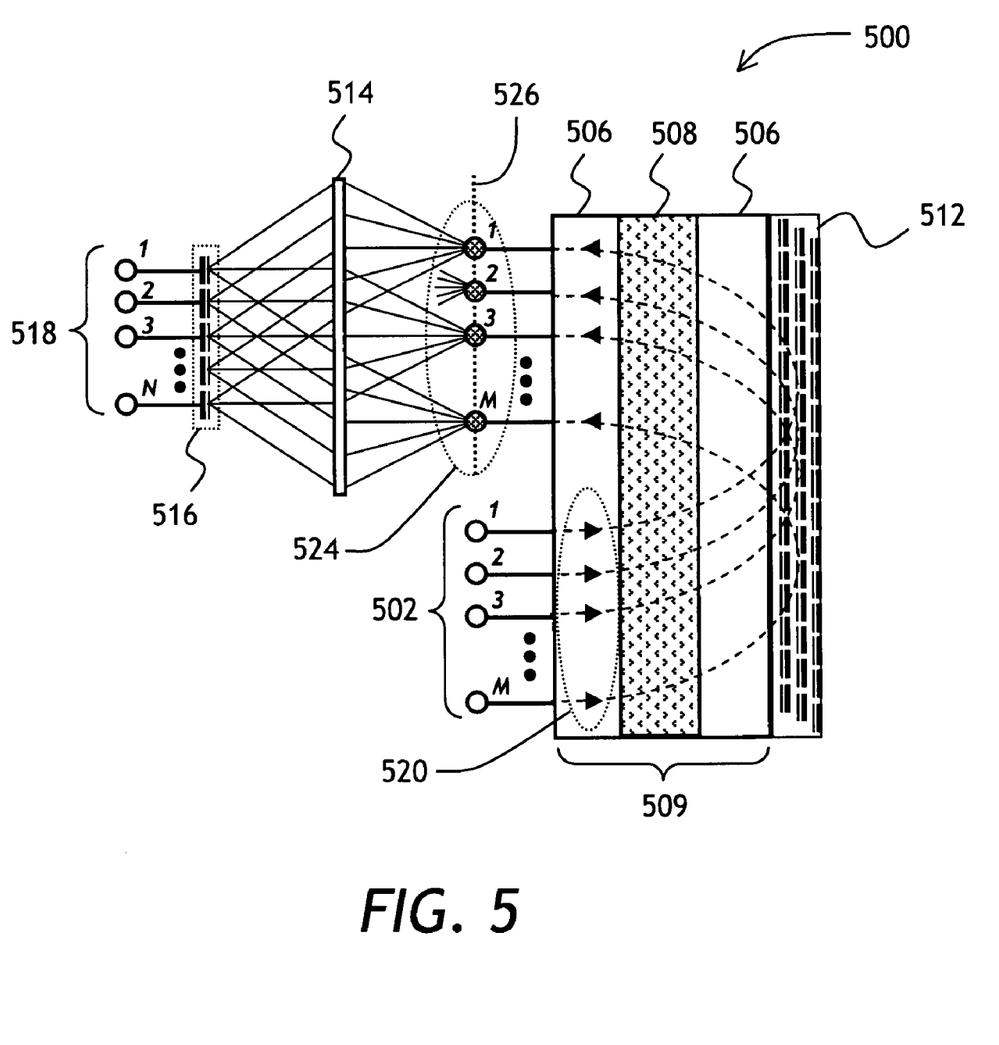
FIG. 5 is a generalized optical circuit of a M×N WSS of the present invention.

Referring now to FIG. 5, a generalized optical circuit of the M×N WSS 500 of the present invention is shown having M input ports 502, a wavelength dispersive coupler 509, an array of switching reflectors 512, an angle-to-offset converter, or "switching coupler" 514, an array of selector reflectors 516, and N output ports 518. In FIG. 5, the coupled optical elements are either conterminous or connected by solid lines. The input ports 502 are optically coupled to the wavelength dispersive coupler 509, which is coupled to the array of switching reflectors 512. The wavelength dispersive coupler 509 is coupled to the angle-to-offset converter 514 through an intermediate focal plane 526, which is coupled to the array of selector reflectors 516, each said selector reflector being coupled to a particular of the output ports 518. The wavelength dispersive coupler 509 has two couplers 506 and a wavelength dispersive element 508. The two couplers 506 can represent a single "intermediate coupler", such as two concave sections of the same concave mirror, as will be described in more detail below.

In operation, light beams 520 from the M input ports 502, each beam 520 carrying a plurality of wavelength channel sub-beams, are coupled to the wavelength dispersive coupler 509, which spatially separates the wavelength channel sub-beams and optically couples these sub-beams to the array of switching reflectors 512. Further, the wavelength dispersive coupler 509 receives the wavelength channel sub-beams individually redirected by said array of switching reflectors and spatially recombines the redirected wavelength channel sub-beams at the intermediate focal plane 526, each of M spots 524 corresponding to a particular of the M input ports 502. At each spot 524, different wavelength channel sub-beams can have different beam angles, i.e. angles of incidence on the plane 526, depending on which of the N output ports 518 a wavelength channel sub-beam is intended to be coupled to. Further, the angle-to-offset converter 514 receives the spatially recombined, redirected wavelength channel sub-beams from the wavelength dispersive coupler 509, and converts the beam angle of the received wavelength channel sub-beams into a lateral offset of said wavelength channel sub-beams, so that the sub-beams impinge on corresponding selector reflectors 516. Each of the selector reflectors 516 is permanently associated with a particular of the output ports 518. Each of the reflectors 516 redirects the offset wavelength channel sub-beams so as to couple the sub-beams from a selected one of the input ports into the associated one of the output ports 518. The reflector arrays 512 and 516 redirect optical beams in dependence upon corresponding control signals, not shown.

The input ports 502 and the output ports 518 are tips of input optical fibers or input waveguides, such as optical fibers of the fiber arrays 202 and 218 of FIGS. 2A to 2C and FIGS. 3A and 3B. The wavelength dispersive coupler 509 is a concave diffraction grating, a concave mirror optically coupled to a planar diffraction grating such as the grating 208, or a lens or a pair of lenses or mirrors coupled to the diffraction grating; that is, the "intermediate" coupler 506 can be a mirror, a lens, or another optical element having a focal length, or having optical power. Herein, the term "optical power" is understood as ability of an optical element to focus light. Similarly, the angle-to-offset converter, or switching coupler 514 is a lens, a concave mirror, or another optical element having optical power. The switching reflectors 512 and the selector reflectors 516 are preferably voltage-controlled tiltable MEMS micromirrors such as the micromirrors of the arrays 212 and 216 of FIGS. 2A to 2C. Alternatively, arrays of any other optical beam directing elements, or directors, can be used, such as tunable liquid crystal phase delay elements working in reflection or transmission, or an array of liquid crystal polarization rotating elements coupled to a polarization dependent beam deflector. Correspondingly, even though the WSS 500 of FIG. 5 is shown with the reflective array 512, it is to be understood by those skilled in the art that such a device can also work in transmission, if the optical path of the beams 520 is "unfolded" and proper optical elements added.

In general, a M×N WSS capable of arbitrary wavelength assignments would require M+N rows of reflectors at the back end, each row having one mirror per wavelength channel. For example, for an optical cross-connect of U.S. Pat. No. 6,711,316 with K=100 wavelengths and M=4 and N=8, a total of (4+8)×100=1200 reflectors would be required. For M=4 and N=80, there would be a total of (4+80)×100=8400 reflectors required. But in a M×N WSS 500 having a large enough number of output ports, only one wavelength needs to be sent to any one output port. This makes practical the configuration of the WSS 500 described above, which requires only M rows of reflectors 512 at the back end and N reflectors 516 at the front end; for example, for M=4 and N=8 and K=100 wavelengths, 4×100+8=408 reflectors, or for M=4 and N=80 and K=100 wavelengths, 4×100+80=480 reflectors are required.

For most applications, N is much greater than M, e.g. 10 to 40 times greater, so that almost all of the wavelength channels in each input optical beam 520 can be directed to different output ports 518, and so that individual wavelength channels or groups of wavelength channels from different input ports 502 can be directed to various output ports 518 simultaneously. As has been noted above, one limitation of the invention is that each output port can only receive signals from one input port. This is acceptable in a "drop" situation when only a single signal will be sent to each output port 518, or in an "add" situation, where the optical paths in the WSS 500 are reversed and only one signal is input to each port 518. The idea is to have N large enough to handle all the channels that would need to be dropped at a particular location.

The M×N WSS 500 is reversible, that is, the light paths could be reversed such that ports described above as "input" ports 502 would be output ports, and ports described as "output" ports 518 would be input ports. A light propagating in reverse, coming in from one of the ports 518, will be redirected by one of the selector reflectors 516 at an angle. The angle-to-offset converter 514 would then direct the beam to one of the spots 524 on the plane 526, depending on the direction given by that particular selector reflector. From this point on, the beam will be automatically re-imaged back to a corresponding one of the input ports 502. For similar reasons, the M×N WSS 200 of FIGS. 2A to 2C is also reversible.

Figure 6:
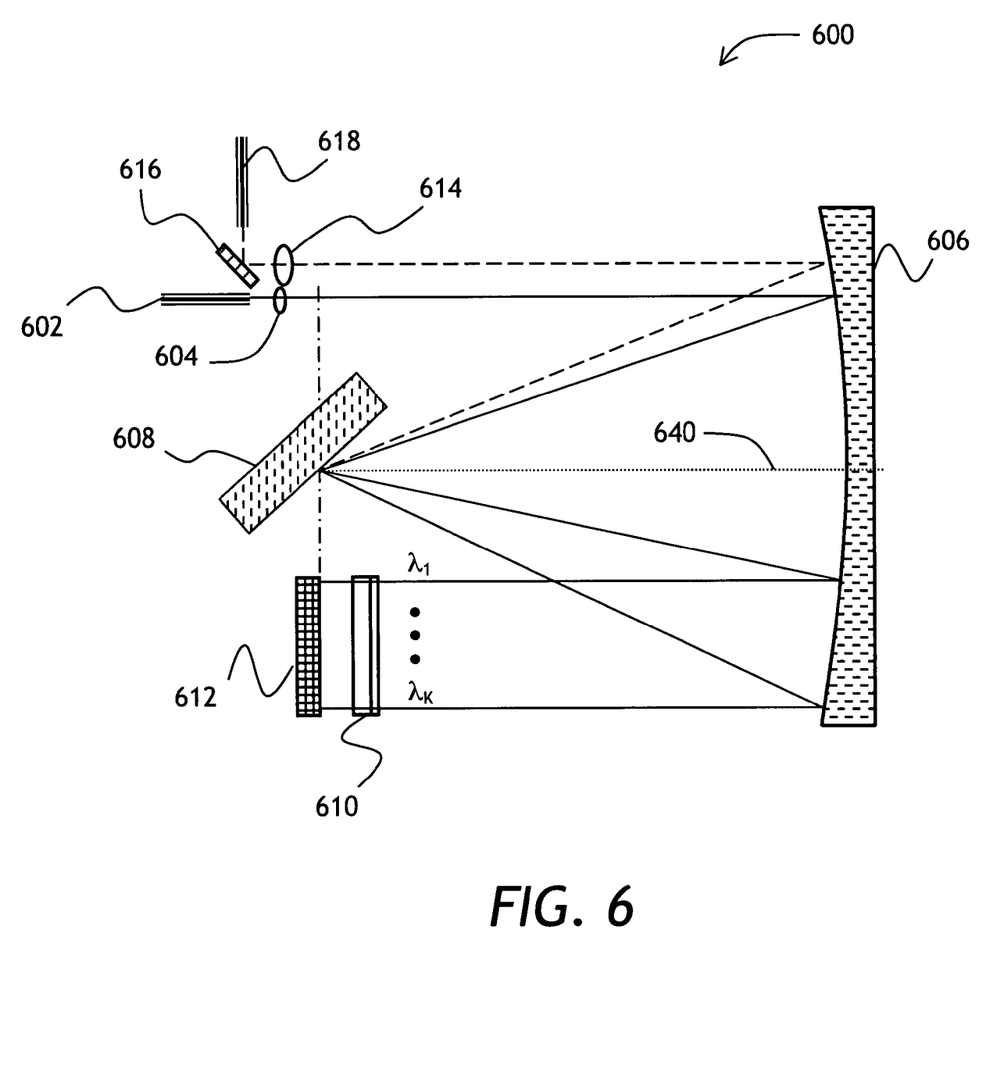
FIG. 6 is a top view of the optics of a M×N WSS of the present invention.

Turning now to FIG. 6, a top view of a preferred embodiment of a M×N WSS 600 is shown. The WSS 600 has an input fiber array unit (FAU) 602, an input microlens array 604, a concave mirror 606, a diffraction grating 608 disposed on an optical axis 640 of the concave mirror 606, a roof prism 610, a two-dimensional first MEMS micromirror array 612, a switching lens 614, a second one-dimensional MEMS micromirror array 616, and an output FAU 618. The elements 602, 604, 606, 608, 610, 612, 614, and 616 correspond to the elements 202, 204, 206, 208, 210, 212, 214, and 216, respectively, of FIGS. 2A to 2C and FIGS. 3A, 3B, and have similar function, with the exception of the concave mirror 606, which also has the function of the lens 207. Indeed, by comparing FIGS. 2A to 2C and FIG. 6, one can see that the elements 206 and 207 correspond to different areas of the same concave mirror 606. Further, the elements 602, 606, 608, 614, 616, and 618 of the WSS 600 FIG. 6 correspond to the elements 502, 506, 508, 514, 516, and 518 of the WSS 500 of FIG. 5.

Figure 7:
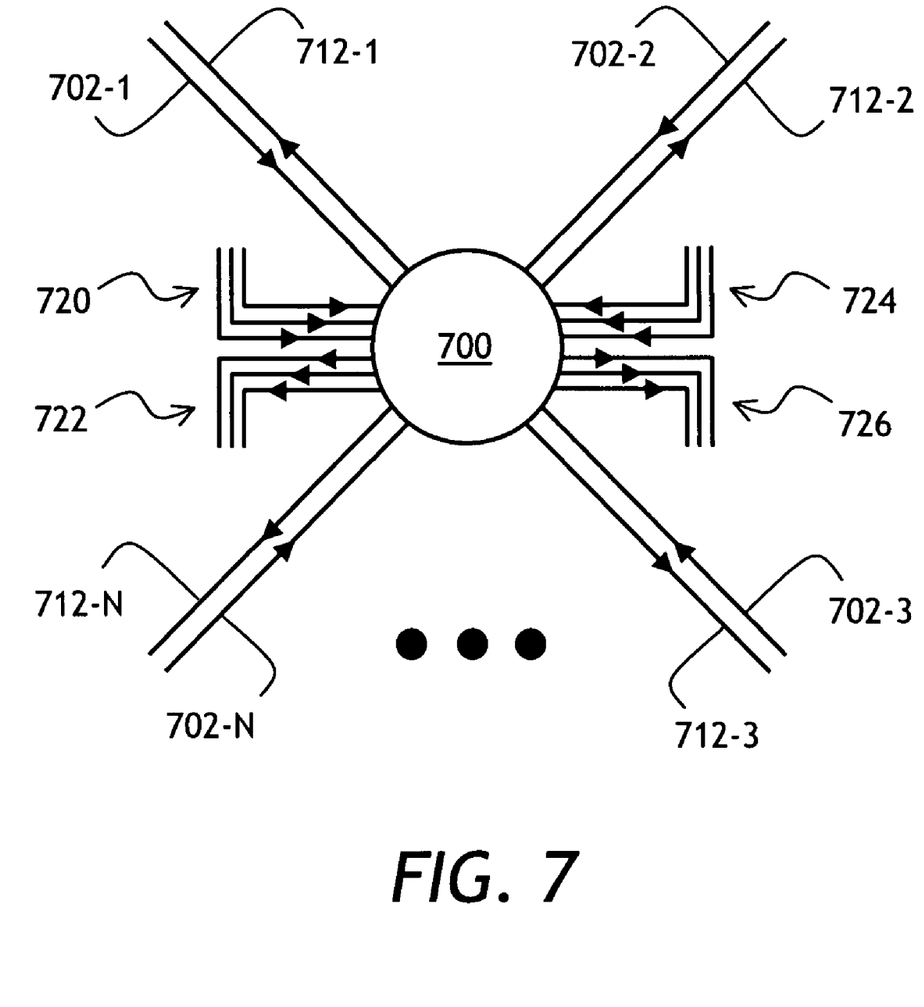
FIG. 7 is an optical configuration of a colorless directionless optical network node according to the present invention.

Exemplary applications of the M×N WSS 200, 500, and 600 will now be considered. Referring to FIG. 7, an optical configuration of an optical network node 700 according to the present invention is illustrated. The function of the optical network node 700 is to independently route wavelength channels between N "directions", each direction being represented by an incoming line 702-1, 702-2, ..., 702-N, and an outgoing line 712-1, 712-2, ..., 712-N; and to add and drop wavelength channels, in an independent and reconfigurable manner, on M separate add lines 720 and M separate drop lines 722. Another set of M add lines 724 and M drop lines 726 is provided for redundancy. The first set of add and drop lines 720 and 722 is sometimes called "West Add/Drop", and the other set 724 and 726 is sometimes called "East Add/Drop". These terms arise from the concept of "East-West separability" that refers to the case of a node with connections running east and west, where signals going to and, or from the East cannot use any of the same components as signals going to and, or from the West.

The optical network node 700 is "colorless", which means that signals of any wavelength can be sent to any of the drop lines 722 or 726, and signals of any wavelength can be input to any of the add lines 720 or 724. It is also "directionless", meaning that any wavelength channel can be reconfigured to go in any direction. An optical network using a plurality of nodes 700 is fully agile and reconfigurable, since any wavelength channel can be sent to any location of the network.

Figure 8:
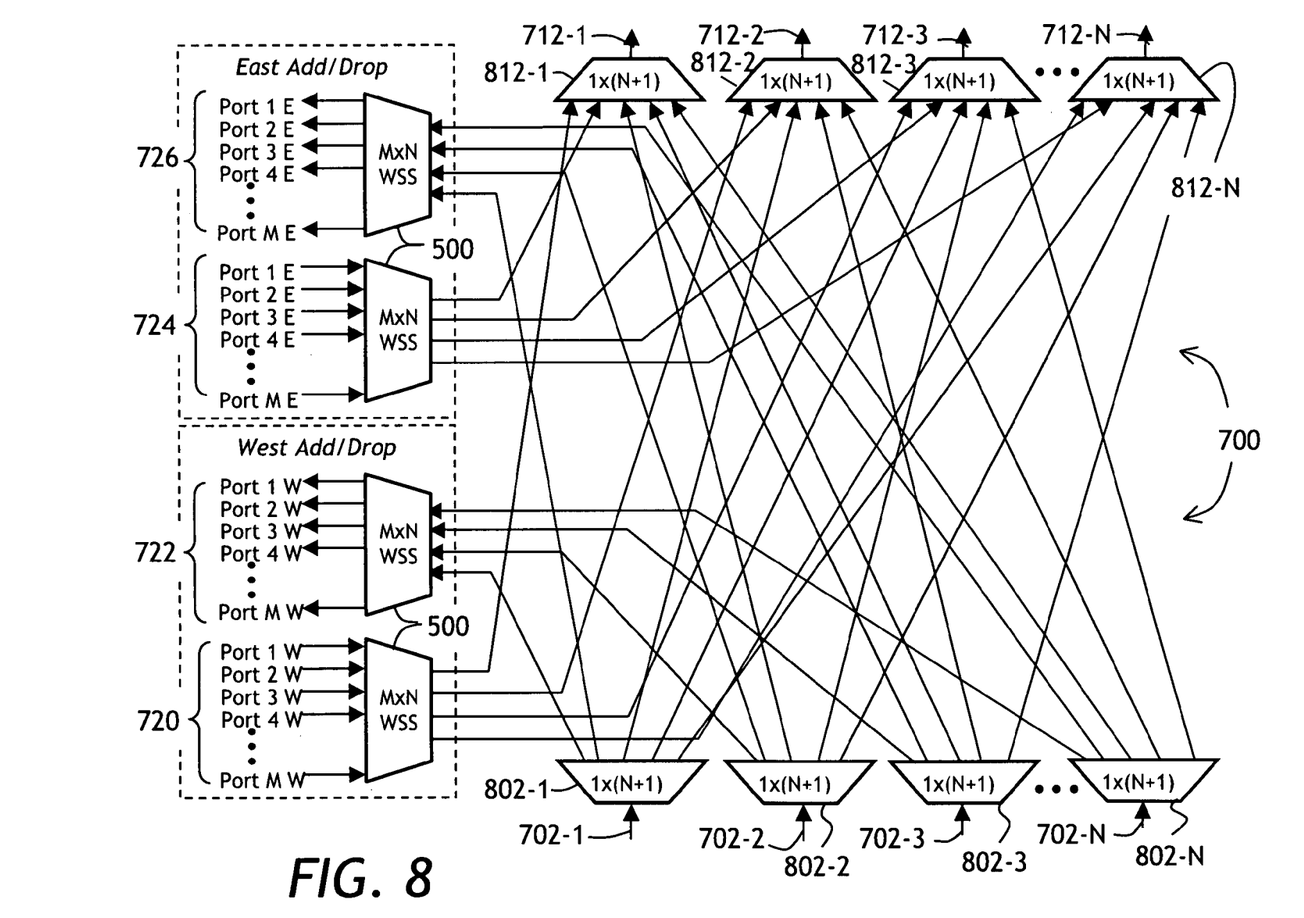
FIG. 8 is an optical circuit diagram showing connections between various elements of the colorless directionless optical network node of FIG. 7.

Turning now to FIG. 8, an optical circuit diagram showing connections between various elements of the colorless directionless optical network node 700 is presented. The node 700 has N 1×(N+1) distributor modules 802-1, 802-2, ..., 802-N; N (N+1)×1 combiner modules 812-1, 812-2, ..., 812-N; and four M×N WSS modules 500. The WSS modules 500 are used for adding and, or dropping wavelength channels on M separate lines each. Every module 500 used for adding wavelength channels is connected, through its N output ports, to each one of the N combiner modules 812-1, 812-2, ..., 812-N; and each module 500 used for dropping channels is connected, through its N "output" ports that are actually used for input, to every one of the N distributor modules 802-1, 802-2, ..., 802-N. The "output" ports of the module 500 can be used as input ports since, as was explained before, the modules 500, and the modules 200 and 600 for that matter, are reversible.

Further, each of the remaining N−1 output ports of each of the N distributor modules 802-1, 802-2, ..., 802-N is coupled to an input port of a particular of the N combiner modules 812-1, 812-2, ..., 812-N. This configuration allows any wavelength channel in any incoming line 702-1, 702-2, ..., 702-N to be switchable to any outgoing line 712-1, 712-2, ..., 712-N of any direction other than the direction of the incoming line, or droppable at the node 700. This configuration also allows any wavelength channel addable at the node 700 to be switchable into any outgoing line 712-1, 712-2, ..., 712-N.

The distributor modules 802-1, 802-2, ..., 802-N are 1×(N+1) wavelength selective switches, or simply 1×(N+1) optical splitters. The combiner modules 812-1, 812-2, ..., 812-N are also 1×(N+1) wavelength selective switches or simply 1×(N+1) optical combiners; however, the combiner modules 812-1, 812-2, ..., 812-N and the distributor modules 802-1, 802-2, ..., 802-N cannot be both the splitters or combiners, because it would lead to undesired interference of wavelength channels at the same wavelength.

What is claimed is:

1. A M×N wavelength selective switch (WSS) module comprising:
M input ports each for inputting a light beam having K wavelength channel sub-beams, and N output ports for outputting a light beam, wherein K, M, N are integer numbers larger than unity;
a wavelength dispersive element for spatially separating the wavelength channel sub-beams along M spaced apart lines of dispersion, wherein each said line of dispersion corresponds to a particular of the M input ports;
a first director array comprising M rows of K directors for directing the wavelength channel sub-beams, wherein each of the M rows is disposed along a particular of the M lines of dispersion, and wherein in each of said M rows, one director is disposed to direct one wavelength channel sub-beam, in dependence upon a control signal applied to that director;
an intermediate focal plane, for receiving the wavelength channel sub-beams;
wherein the M input ports are optically coupled to the wavelength dispersive element, and the wavelength dispersive element is optically coupled to the first director array and to M locations on the intermediate focal plane, wherein each of said M locations corresponds to a particular of the M input ports,
wherein each particular wavelength channel sub-beam has an angle of incidence onto said intermediate focal plane, depending upon a control signal applied to a corresponding director of the first director array, disposed to direct that particular wavelength channel sub-beam;
a second director array comprising N directors for directing the wavelength channel sub-beams, wherein each director is optically coupled to a particular of N output ports, for selecting only one of the M input ports to be optically coupled to said particular of the N output ports, in dependence upon control signals applied to the corresponding director of the second director array;
a switching coupler for optically coupling any particular wavelength channel sub-beam at any of said M locations on the intermediate focal plane to any one of the N directors of the second director array, depending upon the angle of incidence of that particular wavelength channel sub-beam onto the intermediate plane;
whereby any one of the K wavelength channel sub-beams in a particular one of the M input ports is independently switchable into any particular one of the N output ports, in dependence upon control signals applied to corresponding directors of the first and the second director arrays, provided that wavelength channel sub-beams from only one of the M input ports are switchable into the particular one of the N output ports.

2. A M×N WSS module of claim 1, further comprising an intermediate coupler for optically coupling the wavelength dispersive element to the first director array; the first director array back to the wavelength dispersive element; and the wavelength dispersive element to M locations on the intermediate focal plane, wherein each of said M locations corresponds to a particular of the M input ports.

3. A M×N WSS module of claim 2, wherein the intermediate coupler has a first focal length, and wherein the intermediate coupler is disposed one first focal length away from: the wavelength dispersive element; the intermediate focal plane; and the first director array.

4. A M×N WSS module of claim 2, wherein the switching coupler has a second focal length, and wherein the switching coupler is disposed one second focal length away from: the intermediate focal plane; and the second director array.

5. A M×N WSS module of claim 2, wherein the intermediate coupler or the switching coupler comprises an element having optical power.

6. A M×N WSS module of claim 2, further comprising an offset element disposed between the first director array and the intermediate coupler, for laterally offsetting wavelength channel sub-beams impinging on the first director array, so as to laterally offset the M locations on the intermediate focal plane from the M input ports.

7. A M×N WSS module of claim 6, wherein the offset element comprises a roof prism.

8. A M×N WSS module of claim 1, wherein the first or the second director array comprises a MEMS micromirror array.

9. A M×N WSS module of claim 8, wherein the micromirrors of the MEMS micromirror array are tiltable about two axes.

10. A M×N WSS module of claim 1, wherein the first or the second director array comprises an array of tunable liquid crystal phase delay elements.

11. A M×N WSS module of claim 1, wherein the first or the second director array comprises an array of liquid crystal polarization rotating elements coupled to a polarization dependent beam deflector.

12. A M×N WSS module of claim 1, wherein the wavelength dispersive element comprises a diffraction grating.

13. A colorless directionless optical network node for wavelength selective routing of wavelength channels between N directions, wherein each of the N directions has an incoming line and an outgoing line; for adding wavelength channels at the node; and for dropping wavelength channels at the node, the node comprising:
   first and second M×N wavelength selective switch (WSS) modules of claim 1, each for wavelength selective switching of wavelength channels between M first ports thereof and N second ports thereof, wherein the M first ports of the first and the second M×N WSS modules are for adding and dropping wavelength channels at the node, respectively, wherein M and N are integer numbers larger than unity;
   N distributor modules each comprising one input port and N output ports, each associated with a particular of the N incoming lines, for receiving wavelength channels at the input port thereof from the associated incoming line coupled thereto, and for distributing said wavelength channels among the N output ports thereof;
   N combiner modules each comprising N input ports and one output port, each said combiner module being associated with a particular of the N outgoing lines, for combining wavelength channels at the N input ports thereof and outputting the combined wavelength channels at the output port thereof coupled to the associated outgoing line thereof;
   wherein each of the N second ports of the first M×N WSS module is coupled to an input port of a particular of the N combiner modules;
   wherein each of the N second ports of the second M×N WSS module is coupled to an output port of a particular of the N distributor modules; and
   wherein each of the remaining N−1 output ports of each of the N distributor modules is coupled to an input port of a particular of the N combiner modules;
   whereby any wavelength channel in the incoming line of any direction is switchable to the outgoing line of any other direction or droppable at the node, and
   whereby any wavelength channel addable at the node is switchable into the outgoing line of any direction.

14. An optical network node of claim 13, wherein the N distributor modules are 1×N wavelength selective switches, and the N combiner modules are 1×N optical couplers.

15. An optical network node of claim 13, wherein the N distributor modules are 1×N optical couplers, and the N combiner modules are 1×N wavelength selective switches.

16. An optical network node of claim 13,
   wherein the N combiner modules each comprise an additional input port, and the N distributor modules each comprise an additional output port,
   wherein the optical network node further comprises third and fourth M×N WSS modules of claim 1, each for wavelength selective switching between M first ports thereof and N second ports thereof, wherein the M first ports of the first and the second M×N WSS modules are for adding and dropping wavelength channels at the node, respectively;
   wherein each of the N second ports of the third M×N WSS module is coupled to the additional input port of a particular of the N combiner modules;
   wherein each of the N second ports of the fourth M×N WSS module is coupled to the additional output port of a particular of the N distributor modules;
   whereby a redundancy of adding and, or dropping wavelength channels at the node is achieved.

17. A multi-input port, multi-output port wavelength selective switch (WSS) module comprising:
   a plurality of input ports each for launching an optical beam including a plurality of wavelength channel sub-beams each characterized by a beam angle;
   a two-dimensional array of switching reflectors, each switching reflector for receiving one wavelength channel sub-beam launched by one input port, and for redirecting said wavelength channel sub-beam by modifying the beam angle thereof;
   a wavelength dispersive coupler
      for receiving the wavelength channel sub-beams from the input ports,
      for spatially separating the wavelength channel sub-beams,
      for optically coupling the wavelength channel sub-beams to the array of switching reflectors,
      for receiving the wavelength channel sub-beams redirected by said array of switching reflectors, and
      for spatially recombining the redirected wavelength channel sub-beams;
   an angle-to-offset converter
      for receiving the spatially recombined, redirected wavelength channel sub-beams from the wavelength dispersive coupler, and
      for converting the beam angle of the received wavelength channel sub-beams into a lateral offset of said wavelength channel sub-beams; and
   an array of selector reflectors disposed for redirecting the offset wavelength channel sub-beams, so as to couple each said sub-beam into a selected one of the output ports,
   whereby any said wavelength channel sub-beam is switchable between any said input port and any said output port, wherein any selector reflector is disposed to couple wavelength channel sub-beams from only one selected input port, thereby preventing wavelength channel sub-beams launched by any other input port from interfering with the wavelength channel sub-beams launched by the selected input port.

18. A WSS module of claim 17, wherein the wavelength dispersive coupler comprises a concave diffraction grating.

19. A WSS module of claim 17, wherein the wavelength dispersive coupler comprises a diffraction grating optically coupled to a concave mirror.

20. A WSS module of claim 17, wherein the array of switching reflectors or the array of selector reflectors comprises a MEMS micromirror array.

* * * * *